Oct. 28, 1969 E. L. SWARTZ 3,474,805
PRESSURE AND TEMPERATURE INSENSITIVE FLUERIC OSCILLATOR
Filed May 17, 1967
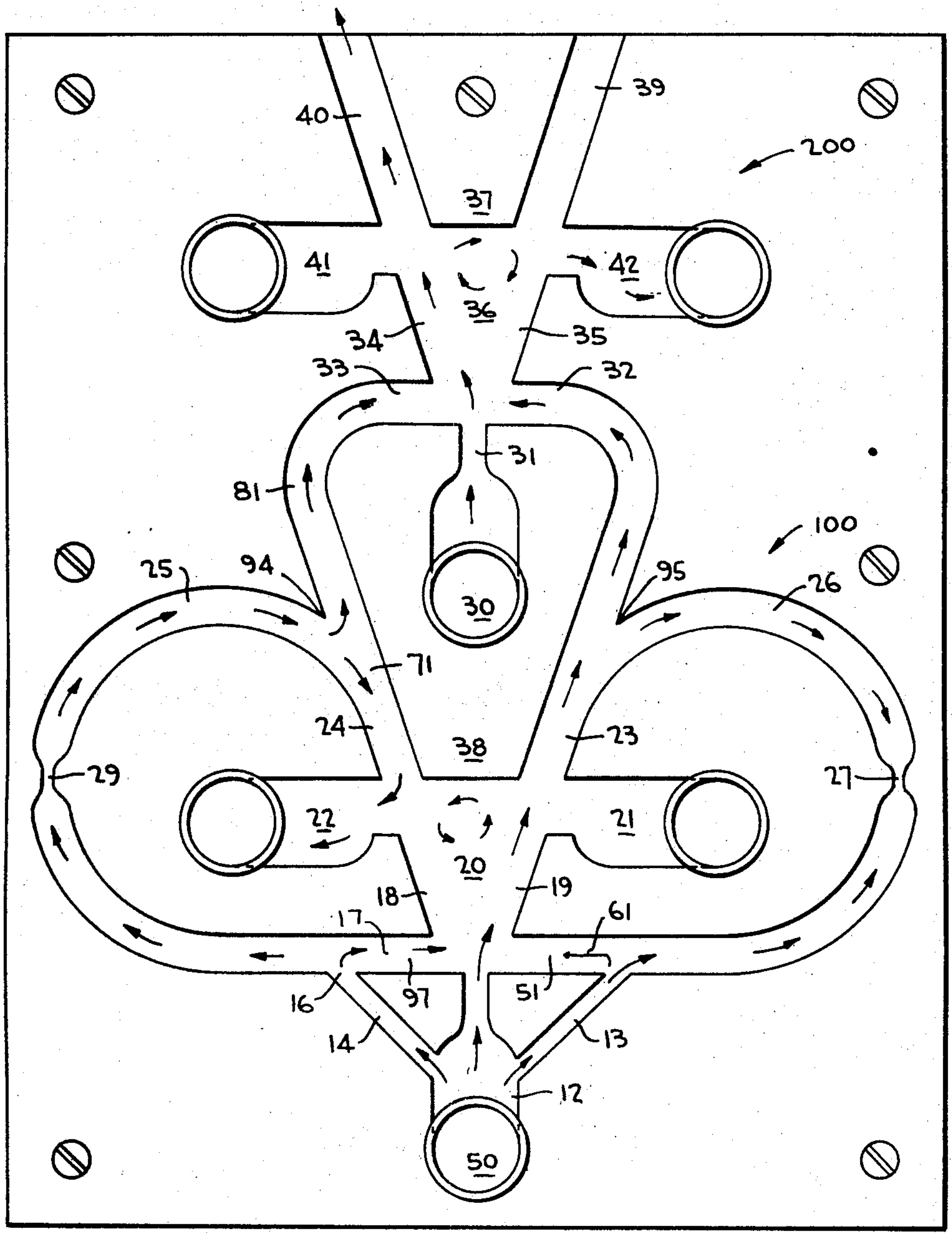
INVENTOR,
ELMER L. SWARTZ
BY Harry M. Saragovitz
Edward J. Kelly, Herbert Berl
& Peter J. Coburn 3,474,805
PRESSURE AND TEMPERATURE INSENSITIVE FLUERIC OSCILLATOR

Elmer L. Swartz, Falls Church, Va., assignor to the United States of America as represented by the Secretary of the Army Filed May 17, 1967, Ser. No. 640,782
Int. Cl. F15c *1/14*
U.S. Cl. 137—1 9 Claims

ABSTRACT OF THE DISCLOSURE

A fluid under pressure is fed to a first biased fluid amplifier. The first fluid amplifier has feed-back loops connecting each of its output conduits to its control conduits and also bias slots connecting each control conduit with the power input. The output conduits of the first fluid amplifier act as the control conduits of a second bistable fluid amplifier. Due to the geometry of the fluid system the oscillation of the second fluid amplifier is insensitive to pressure and temperature fluctuations of the fluid in the first fluid amplifier and hence acts as a temperature and pressure insensitive flueric oscillator.

Cross-referenced related applications

Ser. No. 582,481, filed Sept. 26, 1966 for a "Temperature Insensitive Fluid Oscillator" by Joseph M. Kirshner and Carl J. Campagnuolo.

Ser. No. 595,538, filed Nov. 18, 1966 for a "Pressure and Temperature Insensitive System" by Carl J. Campagnuolo and Shea O. Rutstein.

Background of the invention

This invention relates to the pure fluid arts and in particular to a pure fluid oscillator system which can produce an oscillatory output whose frequency is insensitive to pressure and temperature fluctuations of the working medium.

There are many types of oscillators in existence today. Electrical and mechanical oscillators are, of course, among the most well known. However, there are inherent disadvantages in each type of oscillator which limits their applicability. Mechanical oscillators require moving parts in order to achieve an oscillatory output. Wear, friction and thermal expansion adversely affect the reliability of these devices thus limiting their use. Electrical oscillators have the inherent disadvantage of requiring a substantially vibration free environment which, in certain situations, may be extremely difficult to obtain.

Pure fluid oscillators have only recently been invented and because of their lack of moving parts and inherent simplicity have been replacing mechanical and electrical oscillators in certain applications. The typical fluid oscillator comprises a main fluid nozzle extending into an interaction chamber. Adjacent the main fluid nozzle are two side walls (hereinafter referred to as left and right side walls). A splitter is positioned opposite the main fluid nozzle to define a left and right outlet channel. Left and right control channels extend through the left and right side walls, respectively, and terminate in two control nozzles which have their center lines passing orthogonally through the center line of the main fluid nozzle. Left and right feedback channels connect the respective outlets with respective control channels.

This type of oscillator has been found to be rugged and dependable in operation eliminating some of the above-mentioned disadvantages of the prior art. However, the frequency of a pure fluid oscillator has been found to vary with pressure and temperature fluctuations of the working medium. The problem of eliminating frequency changes in response to temperature fluctuations was only recently solved and is the subject matter of United States patent application Ser. No. 582,481, filed Sept. 26, 1966 for a "Temperature Insensitive Fluid Oscillator" by Joseph M. Kirshner and Carl J. Campagnuolo.

The temperature insensitive fluid oscillator of Ser. No. 582,481 was modified by Carl J. Campagnuolo and Shea Rutstein to also be pressure insensitive and is the subject matter of Ser. No. 595,538, filed Nov. 18, 1966. While the Campagnuolo and Rutstein oscillator is pressure and temperature insensitive it is very difficult to make because the oscillator components have to comply with rigid mathematical ratios.

It is therefore an object of the present invention to provide a fluid oscillator whose frequency is insensitive to temperature and pressure fluctuations of the working medium and is simple to make.

Summary of the invention

Briefly, in accordance with the present invention, the output conduits of a first fluid amplifier act as the control conduits of a second bistable fluid amplifier. The first fluid amplifier includes a feedback loop in each output channel connected to a corresponding control channel and bias slots connecting each control channel with part of the power input source. A restriction in each of the feedback channels serves to render the oscillations of the output fluid in the second fluid amplifier insensitive to temperature and pressure fluctuations of the working medium in the first fluid amplifier.

Brief description of the drawing

The figure is a schematic representation of a pressure and temperature insensitive fluid oscillator in accordance with the present invention.

Description of the preferred embodiments

In the figure a first fluid amplifier 100 includes a power input port 50 which receives the power fluid and through a power nozzle 12 directs a power jet into an interaction chamber 20. Interaction chamber 20 is defined on the left side by a side wall 18 and on the right side by a side wall 19. Side walls 18 and 19 are straight and provide lock-on, thus making amplifier 100 a bistable type of amplifier. Adjacent side wall 18 is a control channel 17 of constant cross-sectional area, while adjacent side wall 19 is a control channel 51 also of constant cross-sectional area. A bleed 22 and a bleed 21 communicate interaction chamber 20 with atmosphere while a splitter 38 serves to define a left output channel 24 and a right output channel 23. A left bias slot 14 communicates fluid from power nozzle 12 with left control channel 17, while a right bias slot 13 communicates fluid from power nozzle 12 to right control channel 51 for reasons which will soon become apparent. A feedback channel 25 communicates left output channel 24 with left control channel 17 while a right feedback channel 26 communicates right output channel 23 with right control channel 51. A flow restrictor 29 is placed in left feedback channel 25 while a flow restrictor 27 is placed in feedback channel 26. A divider 94 serves to insure that part of the fluid in left output channel 24 will be directed to left feedback channel 25 while a divider 95 similarly serves to insure that part of the output fluid in channel 23 will be directed to feedback channel 26. Left output channel 24 of amplifier 100 is connected to the left control channel 33 of a second fluid amplifier 200 while right output channel 23 of the first fluid amplifier 100 is connected to the right control channel of fluid amplifier 200. A power port 30, in fluid amplifier 200, receives power fluid and by means of a power nozzle 31 directs a power jet into an interaction chamber 36. Interaction chamber 36 is bounded by a left side wall 34 and a right side wall 35. A left bleed 41 and a right bleed 42 are placed on opposite sides of interaction chamber 36 in a manner well known in the art. A splitter 37 serves to define a left output channel 40 and a right output channel 39. As can be seen by my description, fluid amplifier 200 is a conventional bistable fluid amplifier well known to those skilled in the art.

In operation, fluid from power input port 50 is directed by power nozzle 12 to interaction chamber 20. Assuming for purposes of illustration that the fluid is attached to sidewall 19, as shown in the figure, most of the power fluid will be directed to right output channel 23. Part of the fluid from nozzle 12 will be directed to right control channel 51 by bias slot 13 and similarly part of the power fluid will be directed to left control channel 17 by left bias slot 14. The fluid in left control channel 17, and in particular region 16, will be directed partly towards interaction chamber 20 due to the entrained effects of the power jet and partly towards flow restrictor 29. The fluid directed to flow restrictor 29 will seep past the restrictor to a point adjacent divider 94 where the fluid will be divided. Part of the fluid will go to amplifier 200 due to the entrainment effect of the power fluid issuing from nozzle 31, while part of the fluid will be drawn to interaction chamber 20, as shown, due to the entrainment effects of the power fluid there. The power fluid in right control 51 will be directed to restrictor 27 with a small part of the fluid being directed, as shown by arrow 61, to interaction chamber 20 because of the entrainment effects of the power jet there. The fluid in right output channel 23 will go to right control 32 of amplifier 200 to direct the fluid there to left output passage 40 in a manner well known in the art. Divider 95 will insure that part of the fluid in right output channel 23 will be directed to right feedback loop 26 to stop the fluid from bias slot 13 flowing past restrictor 27. This will cause the fluid from bias slot 13 adjacent restrictor 27 in control channel 51 to back up to interaction chamber 20 to switch the power jet there. This cycle will be repeated as long as power fluid is supplied to the system.

If the power fluid supplied to amplifier 100 should undergo a pressure rise, the pressure of the power jet, the fluid in feedback loop 26, and the fluid directed to restrictor 27 by bias slot 13, will undergo a corresponding pressure rise. As the pressure of the power jet directed to interaction chamber 20 rises the pressure of the fluid which will switch the power jet must rise in order to be able to deflect the now higher pressure power jet. This will occur as the pressure of fluid in control channel 51 will rise as the pressure of the fluid supplied to amplifier 100 rises. As the pressure of the fluid in right control channel 51 rises it will be necessary for a higher pressure fluid to be in feedback loop 26 to stop fluid in control channel 51 from flowing past restrictor 27. This will occur as the pressure of the power fluid directed to right output channel 23 will rise and thus the pressure of the fluid in feedback loop 26 will rise. Since the power jet from nozzle 12 is switched when the pressure of the power jet and the pressure of the switching fluid is a certain ratio and since my system will maintain this ratio constant it can be seen that the frequency of amplifier 100 will not be affected by pressure fluctuations applied thereto. Obviously, a similar result will occur if there should be a decrease of pressure applied to amplifier 100.

When the temperature of the fluid source supplied to amplifier 100 increases there will be a corresponding pressure increase with the flow in amplifier 100 as previously described. Amplifier 200 acts as a buffer amplifier and a fluid output having a constant frequency can be obtained from left output channel 40 or right output channel 39.

When there is a rise in the pressure supplied to amplifier 100 there will be a slight rise in the temperature but this will be almost negligible as can be seen from gas law equations. However, the gas law equations show that a slight increase in the temperature of the fluid supplied to amplifier 100 will result in a significant pressure rise of the fluid.

I claim:

1. A fluid oscillator comprising:
(a) a primary source of fluid,
(b) a high energy nozzle for producing a high energy stream,
(c) an interaction chamber for receiving said high energy stream,
(d) first and second output conduits in communication with said interaction chamber,
(e) a first control channel in communication with said interaction chamber to control said high energy stream,
(f) a first feedback loop providing a fluid flow path between said first output conduit and said first control channel,
(g) a first bias channel providing a fluid flow path between said primary source of fluid and said first feedback loop, and
(h) means in said primary source of fluid for directing a low energy stream to said first bias channel.

2. The device according to claim 1 further comprising a restrictor in said first feedback loop to reduce the rate of flow in said loop.

3. The device according to claim 1 further comprising:
(a) a second control channel in communication with said interaction chamber to control said high energy stream,
(b) a second feedback loop providing a fluid flow path between said second output conduit and said second control channel,
(c) a second bias channel providing a fluid flow path between said primary source of fluid and said second feedback loop, and
(d) means in said primary source of fluid for directing a low energy stream to said second bias channel.

4. The device according to claim 3 further comprising a restrictor in each of said first and second feedback loops to reduce the rate of flow in said loops.

5. The device according to claim 4 further comprising a bistable multivibrator having first and second control channels, and means for connecting said first and second control channels of said bistable multivibrator to said first and second output conduits of said oscillator.

6. In the operation of a fluid oscillator having a primary source of fluid, a high energy nozzle, an interaction chamber, and at least two channels in communication with said interaction chamber, the method of producing oscillations whose frequency is independent of pressure and temperature variations of the fluid, comprising the steps of:
(a) diverting part of said fluid from one of said output channels,
(b) feeding back said partially diverted fluid toward said interaction chamber,
(c) deriving a low energy stream from said source of fluid,
(d) directing the major portion of said low energy stream into said feedback path in opposition to the normal direction of fluid flow diverted from said output channel, and
(e) entraining a minor portion of said low energy stream, by the action of said high energy stream, toward the source of said high energy stream.

7. The method of claim 6 further comprising the step of partially restricting the rate of flow in said feedback path.

8. The method of claim 6 further comprising the steps of:

(f) diverting part of said fluid from the other of said output channels, (g) feeding back said partially diverted fluid toward said interaction chamber, (h) deriving a second low energy stream from said source of fluid, (i) directing the major portion of said second low energy fluid into said second feedback path in opposition to the normal direction of fluid flow diverted from said other output channel, and (j) entraining a minor portion of said second low energy stream toward the source of said high energy stream.

9. The method of claim 8 further comprising the step of directing the fluid in each of said output channels into the control nozzles of a bistable multivibrator.

References Cited

UNITED STATES PATENTS

| | | | |
|---|---|---|---|
| 3,001,539 | 9/1961 | Hurvitz | 137—81.5 |
| 3,117,593 | 1/1964 | Sowers | 137—81.5 XR |
| 3,185,166 | 5/1965 | Horton et al. | 137—81.5 |
| 3,220,428 | 11/1965 | Wilkerson | 137—81.5 |
| 3,228,410 | 1/1966 | Warren et al. | 137—81.5 |
| 3,233,522 | 2/1966 | Stern | 137—81.5 XR |
| 3,275,016 | 9/1966 | Wood | 137—81.5 |

FOREIGN PATENTS 1,278,782 11/1961 France.

SAMUEL SCOTT, Primary Examiner

U.S. Cl. X.R.

137—81.5